2,910,366
DIETARY EGG CUSTARD AND METHOD OF MAKING SAME

Herbert Thal Leo and Clarence C. Taylor, Anaheim, Calif.

No Drawing. Application May 16, 1957
Serial No. 659,730

6 Claims. (Cl. 99—139)

This invention relates to a dietary egg custard and to a method of making the same. More particularly, the invention relates to the making of a sugar-free, or substantially sugar-free, egg custard by the use of a minimum methoxyl pectinic acid and by the employment of an artificial sweetening agent in place of sugar.

It is therefore an object of the present invention to provide a dietary egg custard of low calorie count for those who must watch their calorie intake, and of low or substantially no sugar content for diabetics.

It is a further important object of this invention to provide a method of making such a dietary egg custard by the use of a minimum methoxyl pectinic acid and by utilizing, in combination with such pectinic acid, the calcium furnished by a milk product to produce a custard that has all of the desirable characteristics of a conventional egg custard and that has a temperature of set that is sufficiently high that the custard is relatively insensitive to the temperatures reached on hotter days and in warm climates.

It is a further important object of this invention to provide a dietary egg custard that does not require heating the ingredients at any time to the boiling temperature, but only sufficiently high, in the neighborhood of scalding temperatures, to bring the custard mass above its temperature of set.

Other and further important objects of this invention will become apparent from the following description and appended claims.

The minimum methoxyl pectinic acid used in making our dietary egg custard is preferably that disclosed in our pending application Serial No. 485,579, filed February 1, 1955 (now abandoned) and our application Serial No. 617, 698, filed October 23, 1956. As therein disclosed, the minimum methoxyl pectinic acid is prepared from a pectin obtained from citrus peel by the enzymatic action thereon of pectase derived from citrus peel. The enzymatic action is carried to completion, that is, to an extent of dimethylation beyond which no further demethylation can be effected by the use of the pectase derived from the citrus peel in the presence of an excess of a carbonate selected from the group consisting of calcium and magnesium carbonates. Such a minimum methoxyl pectinic acid is capable of forming gels, with and without sugar, and either in the presence or absence of bivalent metallic ions, such as calcium. In the case of calcium gels formed by the use of our minimum methoxyl pectinic acid, such gels may be irreversible if the temperature of set is at or above the normal boiling point of the gel mass, but if the temperature of set is substantially below the boiling point, the calcium gel is reversible in that it may be destroyed by heating above the temperature of set and then the gel reformed by cooling to a temperature below the temperature of set. Dietary egg custards such as hereinafter described have, in general, a temperature of set of around 140° F. or lower, so that to that extent they are reversible, but the temperature of set is sufficiently high so that the resulting custard remains of satisfactory, custard-like consistency throughout any temperature range to which it is likely to be subjected after it has been initially set and is ready for use.

In accordance with the method of our present invention, the minimum methoxyl pectinic acid is mixed separately with whole eggs and then the resulting mixture is mixed with a separate mix containing the milk product, such as unsweetened evaporated milk, an artificial sweetening agent and flavoring material. The minimum methoxyl pectinic acid is preferably used in the form of an aqueous solution, or dispersion, containing a solubilizing and buffering agent, such as sodium or potassium citrate, or other edible alkali metal salt of an oxy organic acid, and a calcium sequestering agent, such as sodium hexametaphosphate.

As an example of a suitable minimum methoxyl pectinic acid solution, such a solution can be prepared from a dry mix having the following composition:

100 g. minimum methoxyl pectinic acid of 80 mesh particle size or finer;
85 g. potassium citrate;
65 g. of sodium hexametaphosphate;
750 g. anhydrous cerelose (dextrose)

1000 g. Total

Six (6 oz.) ounces of the above dry mix composition are dispersed in sufficient water to form 36 fluid ounces (4½ cups) of solution of the minimum methoxyl pectinic acid composition. While the solution can be formed in the cold, it is preferable to heat it to a relatively low temperature such as 100 to 110° F. to effect a proper dispersion or solution of the composition. Such a solution has a pH above about 5.00, and usually around 5.00 to 5.30, although any pH above about 5 is satisfactory.

The following example will serve to illustrate the preparation of a dietary egg custard, on the basis of a one egg recipe, using separate mixes "A" and "B" of the formulae given below:

EXAMPLE

Mix "A"

1 cup (8 fluid oz.) evaporated milk (preferably unsweetened);
1 cup water;
1 teaspoonful of vanilla extract;
1 teaspoonful of artificial sweetener solution (equivalent to 0.5 g. calcium cyclamate).

Mix "B"

1 egg;
2 fluid oz. (¼ cup) of the minimum methoxyl pectinic acid solution given above.

In making Mix "A," a preferred artificial sweetener is one having the following composition:

Per liter of solution:
  80 g. calcium cyclamate;
  20 g. calcium saccharin;
  ½ g. methyl parabenzoic acid;
  1 g. benzoate of soda.

It is preferable to use calcium cyclamate and calcium saccharin for people who have been placed upon a substantially sodium-free diet, but otherwise sodium cyclamate and sodium saccharin could be used.

The evaporated milk used in making Mix "A" is heated to a temperature of 170° F., or higher, but need not be and preferably is not heated to the boiling point. The purpose of the heating is to bring the milk and water to a temperature sufficiently above the temperature of set of the custard mass, so that after mixing "A" and "B" no additional heating is necessary. By using a temperature of around 170° F. for the milk component, Mix "A," the temperature obtained after mixing "A" and "B" is not only above the temperature of set but is also sufficiently high to coagulate the egg, so that all sets up to a satisfactory texture at a temperature of set of 140° F. or less.

In preparing Mix "B" the mixture of the egg and minimum methoxyl pectinic acid solution, without heating, is well beaten, as by the use of a hand beater or a mechanical mixing device, and then Mix "A" and Mix "B" are mixed together and the resulting mixture set aside to cool. Cooling can be effected in a refrigerator at the usual temperatures of 45 to 55°, or at ordinary room temperatures. Setting occurs as the mass cools below the temperature of set.

If, instead of proceeding as above described, we were to mix "A" and "B" and heat them together to a boil, the egg yolk and especially the egg white would cause curdling, which would destroy the smooth texture of the custard.

There is thus an advantage in mixing "A" and "B" in the manner given in the foregoing example, because when "A" is heated by itself to about 170° F. or about the boiling point and added to "B," the resultant temperature is higher than 140° F. but not above about 160° F., and within that temperature range the egg yolk and also the egg white will coagulate into a smooth custard texture, which will be retained on cooling. It is desirable not to stir the custard much after mixing "A" and "B" but to let it cool quietly so as to preserve the desired smooth texture.

On a dry basis, the two fluid ounces of the minimum methoxyl pectinic acid solution specified in Mix "B" is equivalent to approximate 1 gram of dry pectinic acid. The milk provides the calcium ions in sufficient quantity to effect a set with this proportion of minimum methoxyl pectinic acid. Other proportions of minimum methoxyl pectinic acid can be used, but, in general, a sufficient amount of the minimum methoxyl pectinic acid should be used to give the desired consistency and texture in the finished egg custard.

Other unsweetened milk products than evaporated milk can be used, as well as other sources of whole egg than the natural egg, such as a reconstituted egg powder.

It will be understood that modifications and variations may be effected without departing from the scope of the novel concepts of the present invention.

We claim as our invention:
1. The method of making a substantially sugar-free custard, which comprises mixing together to form mix "B" whole egg material, a calcium sequestering agent, a buffer, an artificial sweetening agent and a minimum methoxyl content pectinic acid obtained from pectin derived from citrus peel by the enzymic action on said pectin of a citrus peel-derived pectase carried to completion in the presence of an excess of a carbonate selected from the group consisting of calcium and magnesium carbonates; mixing together at an elevated temperature to form mix "A" an unsweetened liquid milk product and an artificial sweetening agent; mixing together mix "A" and mix "B," mix "A" being sufficiently hot to raise the resulting mixture to a temperature above the temperature of set of a calcium gel formed by the action of the calcium furnished by said milk product upon said minimum methoxyl pectinic acid; and cooling to set the resulting mixture into a calcium gel.

2. The method of claim 1 in which mix "B" is formed at ordinary room temperature; mix "A" is formed at around the boiling point of water and the resulting mixture of "A" and "B" is at temperature sufficient to coagulate the egg white present.

3. The method of claim 1 in which the calcium sequestering agent is sodium hexametaphosphate and the buffer is potassium citrate and the artificial sweetening agent is calcium cyclamate, the proportions of ingredients in the resulting mixture being equivalent to the following:

1 whole egg
1 g. minimum methoxyl pectinic acid
0.85 g. potassium citrate
0.65 g. sodium hexametaphosphate
222 cc. unsweetened evaporated milk
0.5 g. calcium cyclamate 4. A low sugar egg custard comprising a calcium gel produced by the action of calcium furnished by a liquid milk product upon a minimum methoxyl pectinic acid, said gel being of custard-like consistency and consisting essentially of whole egg material, a milk product, artificial sweetening, a calcium sequestering agent, a buffer and minimum methoxyl pectinic acid in sufficient amount to form said calcium gel with said milk product, said minimum methoxyl pectinic acid being obtained from pectin derived from citrus peel by the enzymic action on said pectin of a citrus peel-derived pectase carried to completion in the presence of an excess of a carbonate selected from the group consisting of calcium and magnesium carbonates.

5. A dietetic egg custard of low sugar content consisting essentially of whole egg material, a liquid milk product, an artificial sweetening agent, a calcium sequestering agent, a buffer, and a sufficient quantity of a minimum methoxyl pectinic acid to combine with the calcium furnished by said milk product to form in the presence of the other ingredients a calcium gel of custard-like consistency having a temperature of set of not over about 140° F., said minimum methoxy pectinic acid being one obtained from pectin derived from citrus peel by the enzymic action on said pectin of a citrus peel-derived pectase carried to completion in the presence of an excess of a carbonate selected from the group consisting of calcium and magnesium carbonates.

6. A dietetic egg custard of low sugar content comprising a mixture consisting essentially of whole egg material, a liquid milk product, an artificial sweetening agent, calcium sequestering agent, a buffer and a sufficient quantity of a minimum methoxyl pectinic acid to combine with the calcium furnished by said milk product to form in the presence of the other ingredients a calcium gel of custard-like consistency, the minimum methoxyl pectinic acid being one obtained from pectin derived from citrus peel by the enzymic action on said pectin of a citrus peel-derived pectase carried to completion in the presence of an excess of a carbonate selected from the group consisting of calcium and magnesium carbonates and the proportions of the principal ingredients in the resulting mixture being equivalent to the following:

1 whole egg
1 g. minimum methoxyl pectinic acid
0.85 g. potassium citrate
0.65 g. sodium hexametaphosphate
222 cc. unsweetened evaporated milk
0.5 g. calcium cyclamate References Cited in the file of this patent
UNITED STATES PATENTS

| | | |
|---|---|---|
| 2,536,708 | Angermeier | Jan. 2, 1951 |
| 2,653,105 | Gordon | Sept. 22, 1953 |
| 2,784,099 | Block et al. | Mar. 5, 1957 |

OTHER REFERENCES

"Everybody's Cook Book," by Lord, revised edition, Harcourt, Brace & Co., New York, pp. 222–224.